United States Patent Office 3,002,225
Patented Oct. 3, 1961

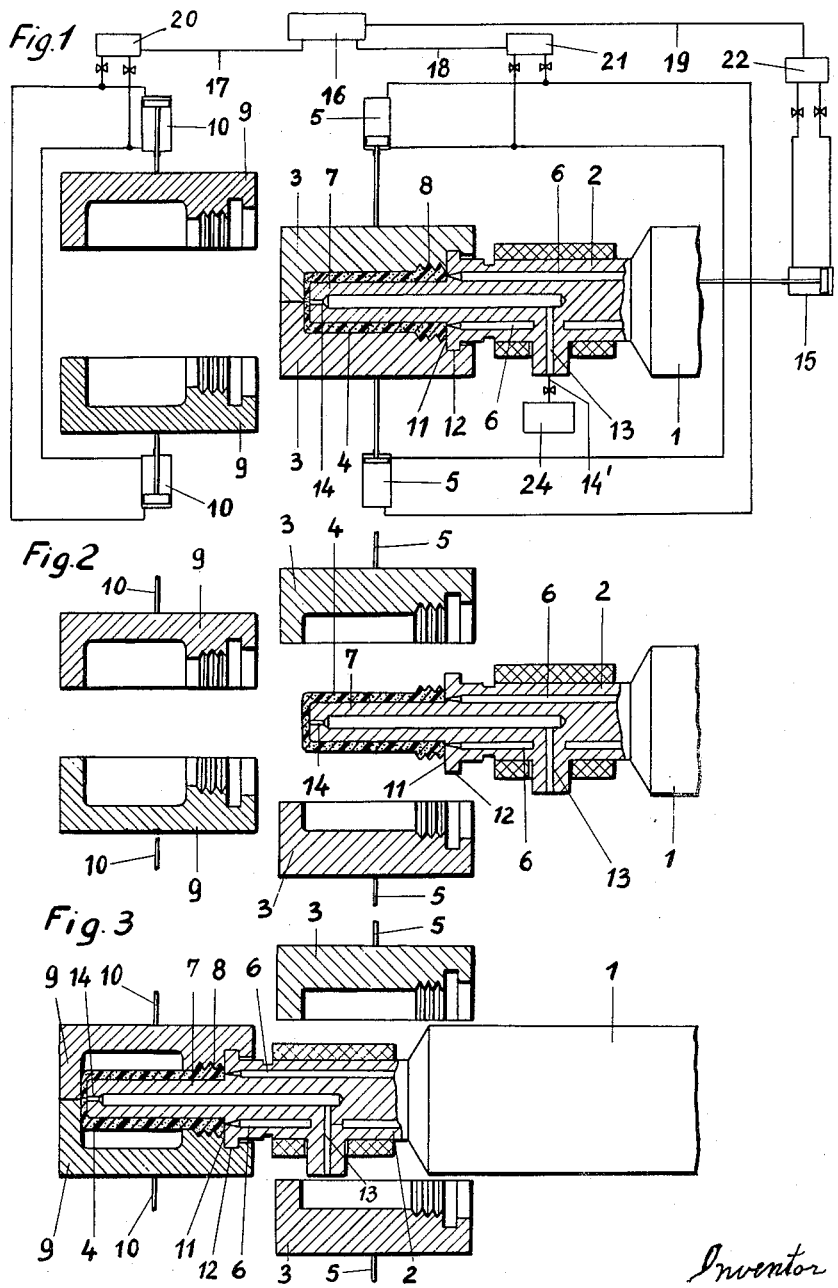

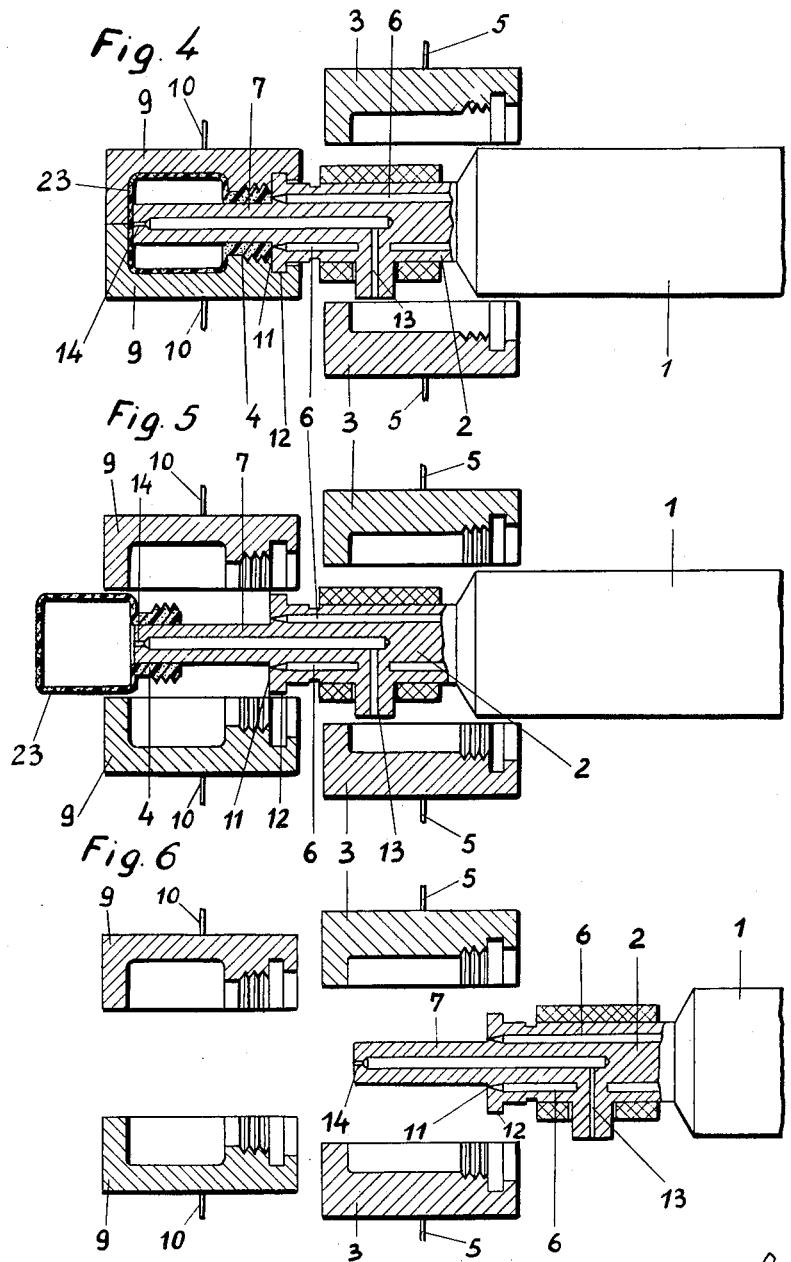

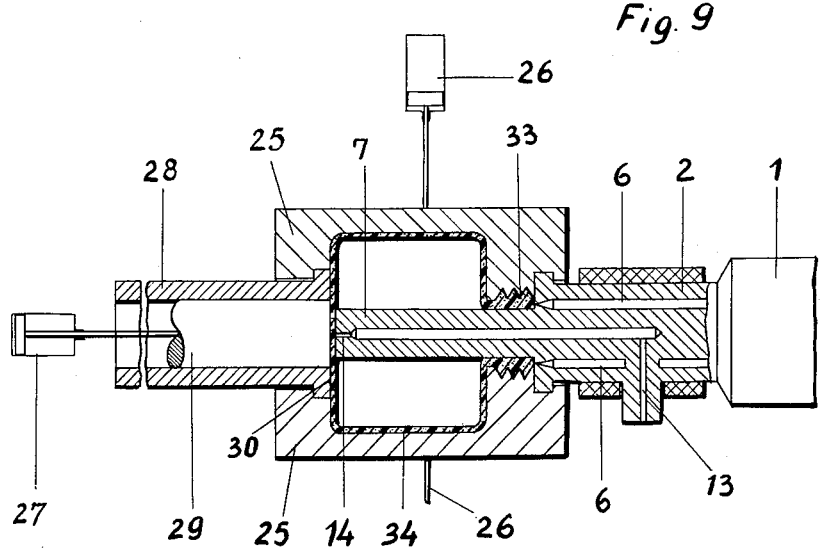
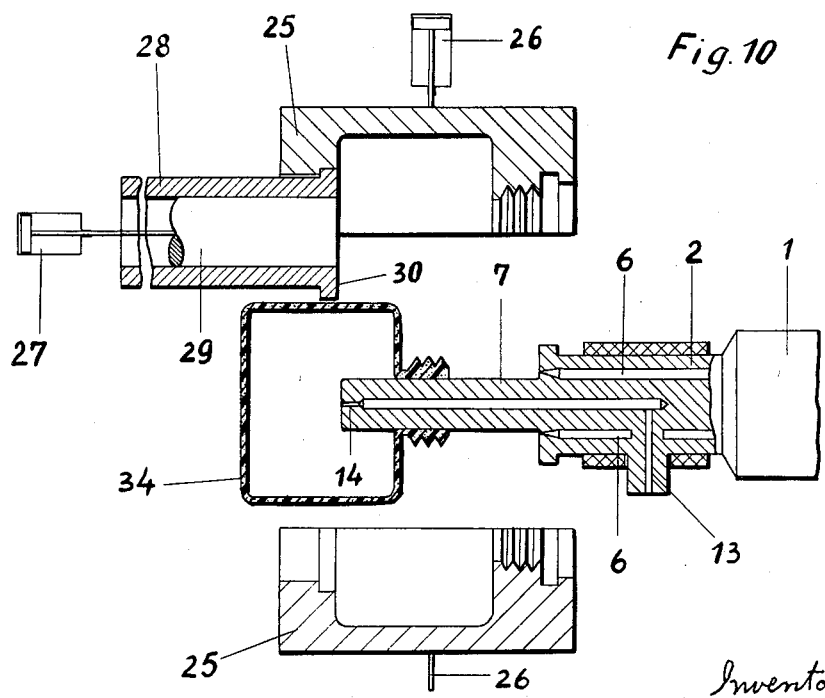

3,002,225
APPARATUS FOR FORMING HOLLOW PLASTIC ARTICLES HAVING AN OPEN NECK PORTION BY INJECTION MOLDING
Herbert Goller, Nurnberg, Bavaria, Germany, assignor to Ankerwerk Gebr. Goller, Nurnberg, Germany, a firm
Filed Apr. 20, 1959, Ser. No. 831,442
Claims priority, application Germany Apr. 26, 1958
3 Claims. (Cl. 18—5)

Various types of molding equipment are available for the production of hollow bodies from thermoplastic masses, wherein an article which is first injected or extruded, is brought into its final shape by blowing. Such equipment is, however, open to the objection that the finishing operation is divided into several phases, so that the workpiece has to be heated several times or deformed or displaced, or the mold has to undergo changes, with the result that complicated mechanical plants or molds are always necessary.

As compared therewith, the apparatus according to the present invention enables such hollow bodies to be produced in a simple manner, whereby a rough molding can be brought directly into its final shape without any intermediate changes.

The basic idea of the invention is to produce a rough molding in an unchangeable mold using an extension of the injection nozzle as the core of this mold in which the rough molding, i.e., parison, is formed with a preformed bottom. Either this parison passes directly thereafter into a second unchangeable mold located in the same axis as the first or injection mold, or the injection mold is withdrawn and thereby exposes the main or blow mold. The parison is then dilated or blown through bores in the above-mentioned nozzle core. To obtain any desired different wall thicknesses in the finished article, the core or the injection mold and consequently the parison can have a shape which is not cylindrical. Thus particular effects in shape and strength can be obtained by giving the injection and blow molds any desired shape so that they are not by any means confined to rotation symmetrical shape and moreover they may be provided with heating and cooling passages as well as with pneumatic or mechanical profile forming devices. Furthermore, the longitudinal orientation of strength in the case of injection molding of relative long articles, is particularly favorably influenced by radial blowing. As the injection nozzle, gathering mold, i.e., injection mold and finishing mold, i.e., blow mold are located in the same axis and the rough molding does not have to undergo any intermediate changes, this principle leads to the above-mentioned total short working time, using simple means which can be incorporated in a machine of compact construction.

One of the most important advantages of the method according to the invention is that the injection-molding, contrary to the rough molding obtained by the extrusion press, can be given a particularly advantageous preliminary shape for example for conical bottles, bellied receptacles, angular bottles, containers of any shape with a bottom of any desired thickness, without weld seam, and so forth.

Other advantages and features of the invention will become apparent from the following description of two embodiments illustrated by way of example in the accompanying drawings, in which:

FIG. 1 shows the first form of construction of a plant in the position for carrying out the first working stage;

FIGS. 2 to 6 show other working positions of the plant according to FIG. 1 in the course of the production of a molded article;

FIGS. 8 to 10 show the plant according to FIG. 7 with the parts in the positions for carrying out the subsequent working stages in the production of a molded article.

Figure 7:
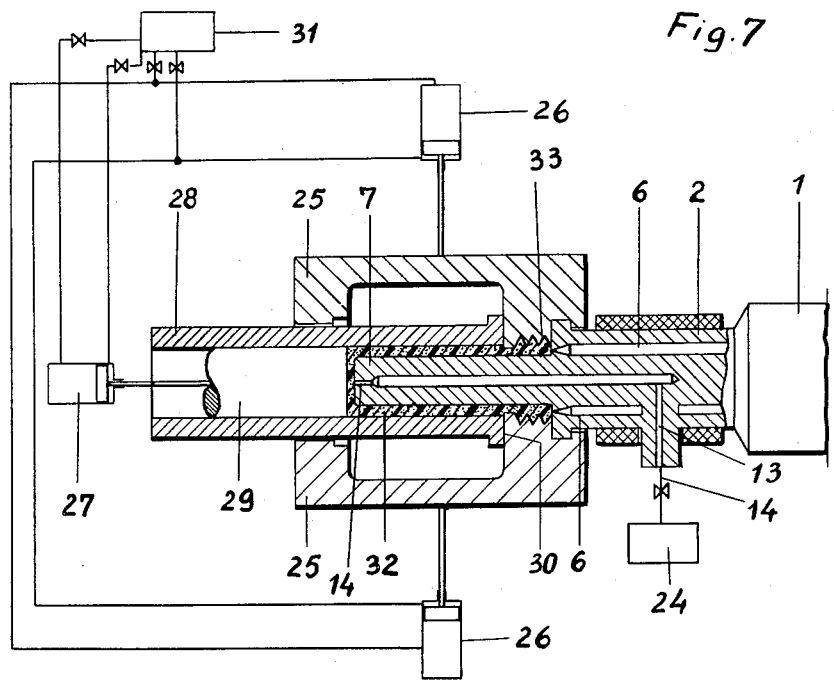
FIG. 7 shows the second embodiment of the invention in the first working stage.

Only the parts necessary for carrying out the method according to the invention are illustrated in the drawings and therein the molds and the injection nozzle are shown in section whereas the auxiliary arrangements for supporting and guiding the parts are omitted.

The plant illustrated in FIG. 1 consists of a plasticizing cylinder 1 on which a spraying or injection nozzle 2 is mounted. This nozzle has an extension 7 projecting from its front face provided with an annular flange.

A two-part gathering mold 3 is privided for producing the rough molding designated by 4. The two parts of the gathering mold are arranged on driving systems 5. These driving systems consist, in the example illustrated, of hydraulic cylinder and piston aggregates. In addition, it is pointed out that the invention also covers mechanical, electric or pneumatic drives. A finishing mold 9 is arranged behind the gathering mold 3 in axial direction and also comprises two parts. Each part is connected with a driving system 10 which, in the example illustrated, is a hydraulic cylinder and piston aggregate.

The plasticizing cylinder 1 is likewise connected with a driving system 15 which is also a cylinder and piston aggregate in the example chosen and a movement is imparted to the plasticizing cylinder which enables the extension 7 of the nozzle 2 to be brought out of the gathering mold 3, after it has been opened, and into the finishing mold 9.

For actuating the hydraulic cylinder and piston aggregates 5, 10 and 15, a reservoir or pump 16 may, for example, be provided from which the driving medium under pressure is conducted through the conduits 17, 18 and 19 to the distributors 20, 21 and 22. From these distributors separate conduits lead to the opposite ends of the cylinders. These conduits can be controlled in dependency upon one another, for example, by an automatic controlling device. At least the driving systems 5 and 10 actually belonging together can be controlled in such a manner that they act in a similar manner in the sense of opening and closing the mold, the other end of the cylinder being at the same time connected with an exhaust.

The spraying nozzle 2 is provided with passages 6 which communicate with the plasticizing cylinder and can be closed and terminate in the delivery nozzles. The nozzle body 2 also has passages 13, 14 through which a pressure medium, for example compressed air, is delivered. The passage 13 is connected by a closable conduit 14 with a reservoir or compressor 24 for the pressure medium.

Any number of injection passages and blowing passages can be provided and these can be arranged at any desired places in the nozzle extension. Both the number and positions of these passages will depend upon the article to be produced and vary from mold to mold.

Other features of the invention will become apparent from the following description of the different phases of the working procedure illustrated in the individual figures of the drawings. In FIG. 1 the plasticizing cylinder 1, which produces the plastic melt, and the spraying nozzle 2 on the front end thereof are in retracted position (on the right in the drawing). The two-part mold 3 is moved on to the spraying nozzle 2 and closed by means of the driving system 5 and is then in the position for producing the rough molding 4. The plastic mass is then injected through the passages 6 of the nozzle whereby the extension 7 projecting from the nozzle forms the core for the rough molding 4. Owing to the construction of the mold 3 and the extension 7 of the nozzle the rough molding 4 already has the base of the hollow body to be formed but it is not as yet in its final shape. The bottle neck 8 provided for example with a screw thread can also be partly or completely formed in this mold. It is evident that the gathering mold 3 must be provided with a suitably profiled section at the junction end of the nozzle 2.

In FIG. 2 the two-part gathering mold has been opened by the driving aggregate 5. Hereby the rough molding remains on the extension core 7 and is still in plastic state. At the same time the two-part finishing mold 9 is moved in closing direction by means of the driving aggregates 10. The plasticizing cylinder 1 is provided with its driving aggregate 15 for shifting the rough molding 4 formed on the extension 7 into the finishing mold 9 which is still sufficiently wide open.

FIG. 3 shows the plasticizing cylinder 1 and the spraying nozzle 2 with its extension 7 carrying the rough molding 4 at the end of their forward movement with the finishing mold 9 closed. The nozzle face 11 of a flange 12 is in contact with a corresponding surface of a groove in the mold 9 with the result that the flange is locked in the mold. A similar locking means was moreover also provided on the gathering mold 3 as can be seen from the drawing, similar parts being designated by the same reference numerals.

If the bottle neck 8 is provided with a screw thread or the like the finishing mold 9 can be closed in two phases or supplementary parts or mold members such as are known in the technique of injection molding, may be provided. It can be seen from the drawing that the finishing mold 9 has a mold space which corresponds to the other dimensions of the finished product.

In the working phase illustrated in FIG. 4 a pressure medium such as compressed air, is forced into the rough molding through the passages 13 and 14. As this molding is still in thermoplastic state, it is forced out against the inner wall of the finishing mold 9, its wall thickness being deformed in the process. On cooling it has the desired final shape of the finished product 23 determined by the finishing mold 9.

From FIG. 5 it can be seen that the finishing mold 9 is now again opened by the driving aggregates 10. The finished product 23 is ejected, for example by again passing compressed air through the passages 13 and 14 or by other means known in the technique of injection molding.

In FIG. 6 the plasticizing cylinder 1 with the spraying nozzle 2 and its extension 7 have been run back into their initial position (towards the right in the drawing), this being effected by the driving aggregate 15 which is again rendered operative for the purpose. The gathering mold 3 and the finishing mold 9 are already open so that the plant is once more in its initial position ready for the next operation.

It is evident that for the purpose of injecting the thermoplastic mass into the gathering mold, the mouths of the spraying nozzles are provided at the base or root of the extension 7, that is in the so-called nozzle face 11. In the drawing two such nozzle mouths are shown. However it is within the scope of the invention to provide a greater number of nozzles terminating in the extension 7.

The mouth of the passage 14 is, in the example illustrated, located in the end face of the extension 7. This constitutes a particularly practical form of construction.

FIGS. 7 to 10 show another plant. In this form of construction, however, the plasticizing cylinder 1 and the spraying nozzle 2 with its extension 7 are similar to those in the first form of construction so that these parts are designated by the same reference numerals.

In the construction illustrated in FIGS. 7 to 10 the plasticizing cylinder which produces the plastic melt and on which the spraying nozzle 2 and its extension 7 are arranged are in a fixed unchangeable position, that is are stationary. In this form of construction the two-part finishing mold 25 for producing the finished injection molding is arranged movable in relation to the extension 7. The two parts of the finishing mold 25 are connected up with driving systems 26 which in the example illustrated are also in the form of cylinder and piston aggregates. By means of these driving systems the two parts of the finishing mold 25 are moved on to the spraying nozzle 2 and closed.

In addition a tubular slide 28 is provided which can be run into the two-part finishing mold 25 by means of the driving system 27 consisting for example of a hydraulic cylinder and piston aggregate. Thus the slide 28 can move on a core shaft 29 rigidly connected with one of the parts of the mold 25. The slide 28 seals off its internal space from the remaining space of the finishing mold 25 by means of an annular flange face formed on its end. Thus the tubular slide 28 and the finishing mold 25 form together the gathering mold, the bottom of which is formed by the fixed core shaft 29. A reservoir or pump 31 is provided for the hydraulic pressure medium for actuating the driving aggregates 26 and 27. The conduits leading to the driving aggregates 26 or to the driving aggregates 27 are controlled in mutual dependency in such a manner that the end of the cylinder remote from the end receiving the pressure medium is brought into communication with an exhaust.

It is pointed out that, according to the form of construction illustrated in FIGS. 1 to 6, a closable conduit and a reservoir or compressor 24 for the pressure medium are connected up with the passage 13 to the nozzle.

In the phase shown in FIG. 7, the plastic mass is injected through the passages 6 in the nozzle. Here the extension 7 of the nozzle forms the core for the rough molding 32. By the arrangement shown the rough molding 32 constitutes the base of the hollow body to be produced but is not yet in its final shape. The bottle neck 33 which is, for example, provided with a screw thread, is not however completely formed.

Figure 8:
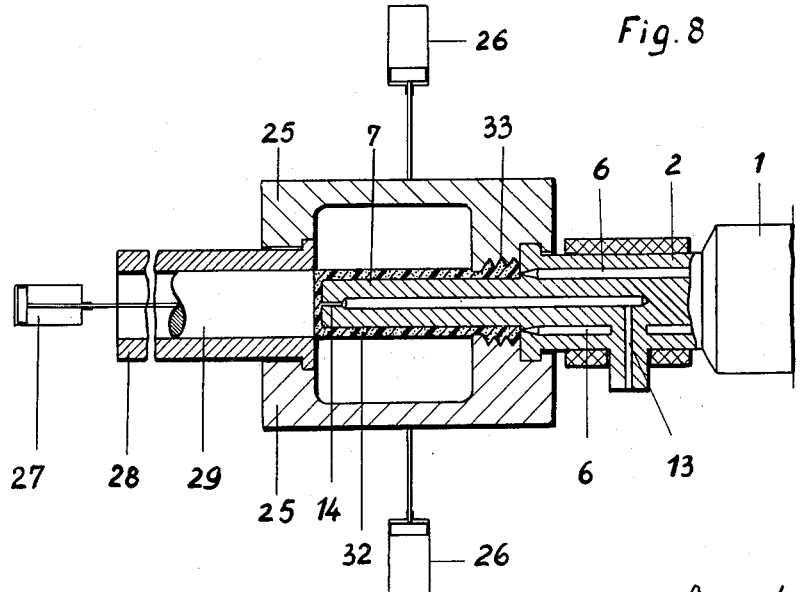

According to FIG. 8 the tubular slide 28 withdrawn from the two-part mold 25 over the stationary core shaft 29 by means of the driving aggregate 27. In its retracted position in which the flange-like projection bears against a corresponding shoulder of the finishing mold 25, the core shaft 29 and the slide 28 constitute the bottom of the finishing mold. The rough molding 32 remains in plastic state on the extension 7 of the nozzle.

FIG. 9 shows the working phase in which pressure medium is forced through the passages 13 and 14 into the rough molding. As this is still in thermoplastic state the rough molding is adapted to the shape of the inner wall of the finishing mold 25, its wall thickness being reduced in the process. In this state it assumes on cooling, the desired final shape of the finished product.

As can be seen from FIG. 10, the finishing mold 25 is opened by the action of its driving aggregates 26, with the result that the gathering mold, consisting of the core shaft 29 and the slide 28, is run out laterally. Thereupon the finished article 34 is ejected, for example by again forcing a short blast of compressed air through the passages 13 and 14 or by some other means known in the technique of injection molding. The plant is now returned into its initial position.

It is pointed out that by a radial arrangement of the halves of the gathering and finishing molds, a complete phase of movement can be saved.

Finally, it is evident that all the driving aggregates can be mechanically, hydraulically and electrically operated without departing from the scope of the invention.

I claim:

1. Apparatus for forming hollow plastic articles having an open neck portion comprising in combination an injection mold formed in a plurality of separable parts, a blow mold formed in a plurality of separable parts, a movable plasticizing cylinder, an injection nozzle fixed axially of said cylinder upon one end thereof, means for axially reciprocating said cylinder, means for reciprocating said injection mold parts normally of the longitudinal axis of said cylinder between an open position and a closed position surrounding said injection nozzle, and means for similarly reciprocating said blow mold parts, said injection nozzle comprising a nozzle mouth, conduit means communicating said mouth with the said cylinder and a fixed extension which extends from said nozzle axially thereof beyond said nozzle mouth whereby said extension acts as a core during the production of a parison in the injection mold and passage means within said extension for feeding pressure fluid out the free end of the extension for blowing plastic material within said blow mold.

2. Apparatus for forming hollow plastic articles having an open neck portion comprising in combination a blow mold formed in a plurality of separate parts, said blow mold having an article neck forming open end, an open end in said blow mold opposite to said neck forming end, a two-piece injection mold slidably carried in the opening of the blow mold opposite to said neck forming end, one of said injection mold pieces comprising a tubular slide and the second piece comprising a core shaft slidable within the tubular slide, an inwardly facing shoulder portion formed in said blow mold around the opening in which said injection mold slides and a corresponding flange-like projection on said tubular slide, means for reciprocating said tubular slide and said core shaft axially within the closed blow mold to a position engaging the outer face of said flange-like projection against the inner surface of the blow mold which defines said neck forming opening to a position in which said flange-like projection seats in said shoulder of said blow mold, a movable plasticizing cylinder, means for reciprocating said cylinder along the axis of said blow mold openings, means for reciprocating said blow mold parts normally of said axis, an injection nozzle fixed axially of said cylinder upon one end thereof, said injection nozzle comprising a nozzle mouth, conduit means communicating said mouth with said cylinder and a fixed extension which extends from said nozzle axially thereof beyond said nozzle mouth, whereby said extension acts as a core during the production of a parison within the cavity formed by said injection mold and passage means within said extension for feeding pressure fluid out of the free end of the extension for plastic material within said blow mold, while said tubular slide is withdrawn to a position engaging said flange-like projection with said corresponding shoulder of the blow mold.

3. In an apparatus for forming hollow plastic articles having an open neck portion wherein a parison is first formed in an injection mold and the parison is then blown into the finished hollow article in a blow mold, the improvement which comprises in combination a movable plasticizing cylinder, means for axially reciprocating said cylinder, an injection nozzle unit fixed axially of said cylinder upon one end thereof, a nozzle mouth formed in said nozzle unit, conduit means communicating said mouth with said cylinder, an extension fixed upon said nozzle unit so as to extend axially of said unit beyond said mouth whereby said extension acts as a core during production of a parison from plastic material ejected from said mouth and passage means within said extension for feeding pressure fluid out the free end of the extension to blow plastic material surrounding the extension into a final shape.

References Cited in the file of this patent

UNITED STATES PATENTS

| 2,469,130 | Rodman | May 3, 1949 |
| 2,853,736 | Gussoni | Sept. 30, 1958 |
| 2,872,700 | Knowles | Feb. 10, 1959 |
| 2,913,762 | Knowles | Nov. 24, 1959 |

FOREIGN PATENTS

| 154,343 | Australia | Nov. 27, 1953 |